(12) United States Patent
Simon (10) Patent No.: US 7,869,943 B1
(45) Date of Patent: Jan. 11, 2011

(54) FLIGHT MANAGEMENT SYSTEMS AND METHODS FOR USE WITH AN AERIAL VEHICLE

(75) Inventor: Jeffrey M. Simon, Sudbury, MA (US)

(73) Assignee: Honeywell International Inc., Morristown, NJ (US)

( * ) Notice: Subject to any disclaimer, the term of this patent is extended or adjusted under 35 U.S.C. 154(b) by 507 days.

(21) Appl. No.: 11/963,763

(22) Filed: Dec. 21, 2007

(51) Int. Cl.
*G01C 21/00* (2006.01)
(52) U.S. Cl. .......................... 701/206; 701/14; 701/23; 701/33; 701/36; 701/201; 701/211; 244/75.1; 340/995.17
(58) Field of Classification Search .................. 701/3, 701/14–16, 23, 25, 33, 36, 201, 207, 208, 701/211, 206; 244/75.1, 158.1; 340/995.1, 340/995.17, 995.21, 995.27
See application file for complete search history.

(56) References Cited

U.S. PATENT DOCUMENTS

| | | |
|---|---|---|
| 2,784,307 A | 3/1957 | Burton |
| 3,605,083 A | 9/1971 | Kramer |
| 3,643,213 A | 2/1972 | Yurasek et al. |
| 3,711,826 A | 1/1973 | La Russa |
| 3,784,969 A | 1/1974 | Wilckens et al. |
| 3,786,505 A | 1/1974 | Rennie |
| 3,789,356 A | 1/1974 | Harenberg, Jr. et al. |
| 3,843,554 A | 10/1974 | Aykan et al. |
| 4,057,782 A | 11/1977 | Muller |
| 4,316,252 A | 2/1982 | Cooper |
| 4,368,517 A | 1/1983 | Lovering |
| 4,419,079 A | 12/1983 | Georges et al. |
| 4,419,731 A | 12/1983 | Puffett et al. |
| 4,660,157 A | 4/1987 | Beckwith et al. |
| 4,825,374 A | 4/1989 | King et al. |
| 4,999,780 A | 3/1991 | Mitchell |
| 5,047,942 A | 9/1991 | Middleton et al. |
| 5,101,357 A | 3/1992 | Tempelhof et al. |
| 5,115,398 A | 5/1992 | De Jong et al. |

(Continued)

FOREIGN PATENT DOCUMENTS

EP 0 399 670 A2 11/1990

(Continued)

OTHER PUBLICATIONS

1st Class Moving Map, Digital Sky, (No Date).

(Continued)

*Primary Examiner*—Gertrude Arthur Jeanglaud
(74) *Attorney, Agent, or Firm*—Ingrassia Fisher & Lorenz, P.C.

(57) ABSTRACT

The invention provides, in some aspects, flight management systems and methods that generate three-dimensional (3D) graphical representations of airspace in a vicinity of an aircraft (e.g., in flight or during take-off). Such systems can include a display and a processor that drives the display to generate a two-dimensional (2D) or three-dimensional (3D) depiction of flight path. In a first mode, the processor drives the display to generate a flexible highway-in-the-sky (HITS) fight path having an endpoint that is fixed to a destination and having an origin that moves relative to a current location of the aerial vehicle (e.g., a path that "stays" with the vehicle). In a second mode, the processor drives the display to generate a depiction of a fixed HITS flight path that is fixed as to origin and destination and that does not move relative to the craft.

19 Claims, 7 Drawing Sheets

U.S. PATENT DOCUMENTS

| | | | |
|---|---|---|---|
| 5,343,395 | A | 8/1994 | Watts |
| 5,355,442 | A | 10/1994 | Paglieroni |
| 5,566,073 | A | 10/1996 | Margolin |
| 5,638,282 | A | 6/1997 | Chazelle et al. |
| 5,904,724 | A | 5/1999 | Margolin |
| 6,804,585 | B2 | 10/2004 | Humbard et al. |
| 6,985,091 | B2 | 1/2006 | Price |
| 7,120,540 | B2 | 10/2006 | Meunier |
| 7,603,209 | B2 * | 10/2009 | Dwyer et al. ............... 701/14 |
| 7,728,758 | B2 * | 6/2010 | Varadarajan et al. ...... 342/26 B |
| 2002/0069019 | A1 | 6/2002 | Lin |
| 2003/0132860 | A1 * | 7/2003 | Feyereisen et al. .......... 340/973 |
| 2007/0171094 | A1 | 7/2007 | Alter et al. |

OTHER PUBLICATIONS

3 SpaceFastrak, Polhennus, Jan. 1994.

Buening, Tactical Mapping in Combat Aircraft, IEEE, 5 pages, 1998.

Gallant, "System revolutionizes surveying and navigation", EDN, pp. 31-42, Jan. 7, 1993.

GPS 100 AVD Personal Navigator, Garmin International, Inc., 1991.

Hard Drivin, Atari Games Corp., 1988.

Jacobs et al., "Fractal Image Compression Using Iterated Transforms: Applications to DTED", NCCOSC RDT&E Div., pp. 1122-1128, Oct. 11, 1992.

Jeppensen Master Dabase, NavaData (undated).

KNS80 Integrated NAV System, Bendix/King, Apr. 1989.

Lyons, et al., "Some Navigational Concepts for Remotely Piloted Vehicles", Agard Conference Proceedings, Aug. 1976 (15 pgs.).

Magellan GPS Map 7000, Jan. 1999.

Pasman, W. et al., "Implementation of an Augmented Reality System on a PDA," Proc. ISMAR 2003, Tokyo, Japan, (Nov. 4-7, 2003).

Patrick, et al., "ITARS Robust Demonstration System Integration", IEEE, pp. 83-87, 1988.

Raymer, et al., "Advanced Terrain Data Processor", IEEE, pp. 636-639, 1994.

"Steel Talons", Atari Games Corp., 1991.

Trimble Navigation TNL 1000 GPS Navigator 1992 Pilot Guide, 2 pages,.

Uijt De Haag, M. et al., "Terrain Database Integrity Monitoring for Synthetic Vision Systems," IEEE Trans. Aerospace & Electronic Sys. 41:386-406 (Apr. 2005).

U.S. GeoData Digital Line Graphs, U.S. Dept. of the Interior, 12 pages, Jun. 1993.

US GeoData Digital Elevation Models, U.S. Dept. of the Interior, 6 pages, Jun. 1993.

Vadlamani. A. et al., "Improved Downward-Looking Terrain Database Integrity Monitor and Terrain Navigation," Proc. IEEE Aerospace Conf. pp. 1594-1607 (Mar. 2004).

Vadlamani. A. et al., "A 3-D Spatial Integrity Monitor for Terrain Databases," Proc. 23d IEEE/AIAA Digital Avionics Systems Conf. (DASC) p. 4.C.2-1-4.C.2-13 (Oct. 2004).

* cited by examiner

FLIGHT MANAGEMENT SYSTEMS AND METHODS FOR USE WITH AN AERIAL VEHICLE

BACKGROUND OF THE INVENTION

The present application pertains to flight management systems and methods, and, more particularly, to improved systems and methods for cockpit display of flight route information. Such systems and methods can be used, by way of example, for enhanced display of flight paths and navigational indicators, e.g., during take-off.

Flight management systems facilitate an aircraft pilot's duties by displaying flight paths and/or other navigational indicators directing the pilot to a pre-selected destination or waypoint. Typical prior art systems allow a pilot to key in or otherwise input a destination location (e.g., "DTW ILS RWY 22L," indicating the Detroit airport, ILS approach to runway 22L) and one or more waypoints (e.g., "LWM-VOR," indicating the visual omnirange beacon in Lawrence, Mass.). Usually, the pilot enters that information before taxiing the aircraft for take-off. The systems use the information, along with positional data from an on-board navigation system, e.g., a Global Positioning System (GPS), to determine and display bearing and altitude indicators (e.g., arrows, pointers, etc.) showing the appropriate direction of flight. More advanced systems additionally display graphical representations of flight paths guiding the pilot at least partially to the waypoint or other destination. These displays can include a two-dimensional (2D) depiction of a flight path against a map or other representation of geography over which flight will occur. In still more advanced systems, the path is displayed in three dimensions (3D) and includes not just representations of topography but also airspace.

A problem with prior art systems is that they have limited practical use during take-off. For example, it is quite common that a flight path or navigational indicator generated before the aircraft taxies down the runway and lifts off into the air will not be useful after take-off, when the craft's location, heading and altitude have changed. In order to address this problem, pilots have become accustomed to programming waypoint (and other destination) information into their crafts' flight management systems before take-off and, then, to re-programming that information into the systems after take-off in order to insure that displayed flight paths and navigational indicators are accurate. It is likewise true where, upon climb-out from takeoff, a pilot is forced to alter his or her flight path, e.g., to avoid conflicting traffic, obstacles, or restricted airspace—in these situations, too, pilots have become accustomed to reprogramming waypoint (or other destination) information into their crafts' flight management systems after the diversion. Re-programming this information whether during take-off or otherwise can, among other things, distract the pilot and increase the chance for pilot error.

Accordingly, it is an object of the invention to provide improved flight management systems and methods.

Further objects of the invention are to provide such methods and systems for improved display of flight paths both during take-off and other phases of flight.

Yet further aspects of the invention are to provide such methods and systems for improved display of flight indicators.

Still other objects of the invention are to provide such methods and systems as can be readily understood by pilots, copilots, navigators and others.

SUMMARY OF THE INVENTION

The foregoing objects are among those attained by the invention which provides, in some aspects, flight management systems and methods that generate three-dimensional (3D) graphical representations of airspace in a vicinity of an aircraft (e.g., in flight or during take-off). Such systems can include a processor that drives a display to generate a two-dimensional (2D) or three-dimensional (3D) depiction of flight path. In a first mode, the processor drives the display to generate a flexible highway-in-the-sky (HITS) fight path having an endpoint that is fixed to a destination (e.g., specified by the pilot) and having an origin that is fixed to the craft and that moves with it (e.g., a path that "stays" with the vehicle). In a second mode, the processor drives the display to generate a depiction of a fixed HITS flight path that has a fixed, non-moving origin and destination and that do not move relative to the craft.

In related aspects of the invention, the processor enters the first mode of operation during take-off procedures. In further related aspects of the invention, the processor switches from the first mode to the second mode once a first waypoint or other destination has been reached.

In still further related aspects, the processor switches from the first mode to the second mode when (i) the aircraft reaches the first waypoint (or other destination), (ii) the craft comes within a predetermined variance in distance to and/or bearing of that waypoint (or other destination), and/or (iii) flight conditions, geography, air traffic, air space restrictions, the craft's performance capabilities or other conditions dictate (for safety or other reasons) that the flight management system switch from the first to the second mode.

Systems and methods according to the foregoing aspects of the invention are advantageous insofar as they reduce pilot distraction and decrease chance of pilot error, among other benefits. Thus, for example, a flight management system as described above can display a flexible HITS flight path during aircraft take-off and, particularly, as the craft turns during climb-out. If the pilot encounters conflicting traffic and temporarily stops the turn or is otherwise delayed in reaching his first waypoint (or other destination), the flight management system continually updates the flexible HITS display, calculating a successive series of best routings from the craft's changing location to the first waypoint (or other destination). This saves the pilot from having to repeatedly reprogram the flight management system during the climb-out procedure in order to find the best path to the waypoint (or other destination). To maintain safety, the flight management system switches to a fixed HITS display when the craft (i) reaches the waypoint (or other destination)—or comes within a predetermined distance of and/or bearing to that waypoint (or other destination), and/or (ii) flight conditions, geography, air traffic, air space restrictions, the craft's performance capabilities or other conditions dictate (for safety or other reasons) that the flight management system switch from the first to the second mode (i.e., from flexible to a fixed HITS display).

In related aspects of the invention, the processor drives the display to generate the 2D or 3D depiction of the flight path against a map or other representation of topography over which flight will occur. In further related aspects of the invention, the processor drives the display to generate the 3D depiction of the flight path against a three-dimensional representation of topography and airspace.

In other aspects of the invention, the flexible HITS flight path is generated as a function of at least a (i) current location of the aerial vehicle, and (ii) a destination location entered into the processor by a pilot, e.g., prior to take-off.

Other aspects of the invention provide flight management systems and methods that generate textual, graphical, or other indicators of bearing, altitude change and/or other navigational parameters which an aerial vehicle must achieve in order to reach a waypoint or other destination. Such systems can include a processor that drives a display to generate textual and/or two-dimensional or three-dimensional graphical depictions of such indicators. In a first mode, the processor drives the display to generate indicators that it automatically updates relative to a current location of the aerial vehicle. In a second mode, the processor drives the display to generate static indicators of bearing (and/or altitude change) that, once determined, remain fixed (regardless of movement of the craft) until recalculated at request of the pilot.

In still other aspects of the invention, the processor enters the first mode of operation during take-off procedures. In further related aspects of the invention, the processor switches from the first mode to the second mode (i) when the craft reaches the first waypoint (or other destination), (ii) when the aircraft comes within a predetermined variance of distance to and/or bearing of that waypoint (or other destination), and/or (iii) flight conditions, geography, air traffic, air space restrictions, the craft's performance capabilities or other conditions dictate (for safety or other reasons) that the flight management system switch from the first to the second mode.

By way of non-limiting example, a flight management system as described above can display an auto-updating bearing indicator as an aircraft climbs out of the airport in a climbing right turn. The processor can continue updating the indicator until the aircraft's track is within 15 degrees of the bearing to the first waypoint, at which time the processor switches display to the second mode, displaying a fixed indicator until the pilot reprograms a (new) destination into the system.

In further aspects of the invention, the processor drives the display to generate depictions of both the aforementioned HITS flight path representations and bearing, altitude change, or other navigational indicators, all in a single display window.

Still other aspects of the invention provide methods paralleling the operations described above.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
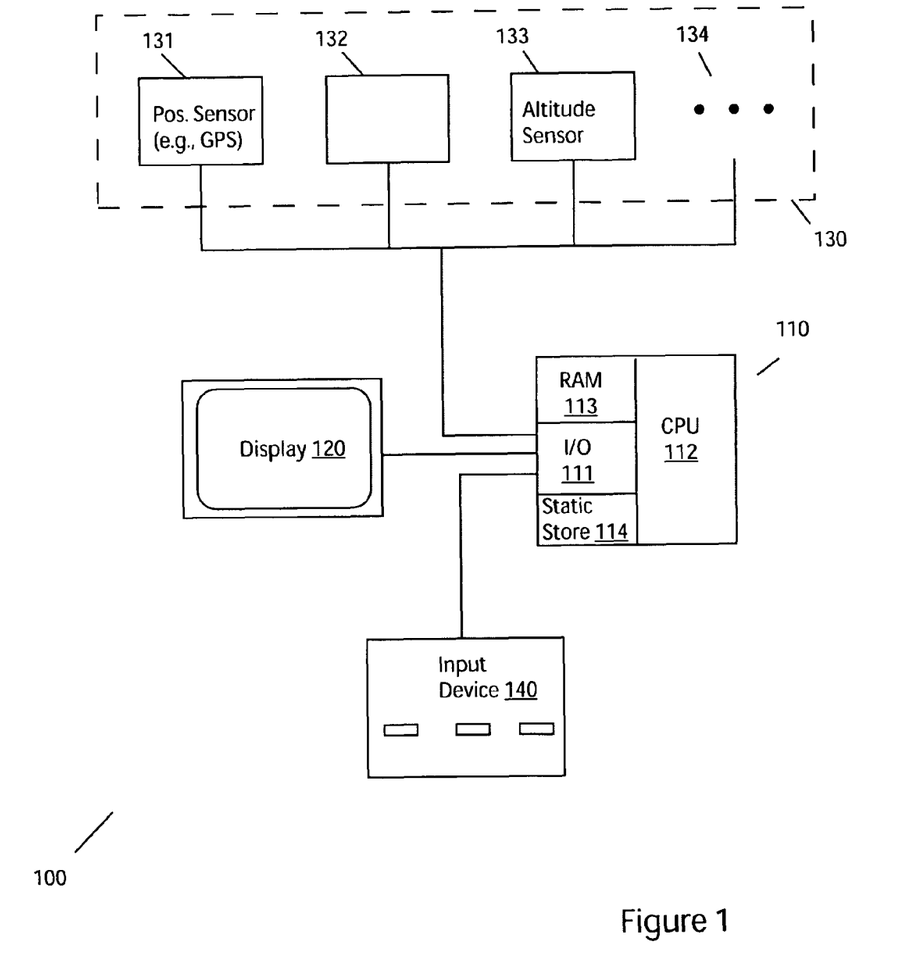
FIG. 1 depicts an exemplary flight management system according to one practice of the invention.

FIG. 1 depicts an exemplary navigational system for use in an aircraft according to one practice of the invention. The system 100 includes a display 120 coupled to a processing unit 110, both constructed and operated in accord with flight navigational systems known in the art (for example, in accord with the VistaNav™ multifunction flight display, sold by the assignee hereof, Mercury Computer Systems Inc., of Chelmsford, Mass.)—albeit as adapted in accord with the teachings hereof.

Illustrated processing unit 110 comprises an input/output (I/O) section 111, a central processing unit (CPU) 112, dynamic memory (RAM) 113 and a static store 114, all constructed, interconnected and operated in the conventional manner of general purpose and/or embedded digital data processing devices used in flight management systems known in the art—again, as adapted in accord with the teachings hereof.

Static store 114 comprises a CD-ROM, DVD, hard disk and/or other long-term storage device of the type known in the art. This can hold software instructions governing operation of the processing unit 110, as well as data reflecting operational capabilities of the aircraft with which the system 100 is used. The latter can include (i) data reflecting theoretical capabilities of the aircraft, e.g., based on "book" values of aircraft lift, weight, drag, glide-ratio, and so forth, (ii) data reflecting the aircraft's historical performance, e.g., at various airspeeds and climb rates, and (iii) data reflecting current aircraft performance and flight conditions (e.g., air traffic, weather, and so forth), as logged by the processing unit 110 to store 114 from sensors, receivers and other apparatus 130. In the illustrated embodiment, the database also maintains a geographic database for use in displaying the geography over which the host aircraft is flying (e.g., mountains, lakes, roads, airports, etc.).

System 100 can include input device 140, such as a keyboard, microphone, touch-pad, or the like, permitting the pilot or other operator to actuate and provide inputs for operation of the system. In the illustrated embodiment, the pilot uses device 140, by way of example, to specify (or "program in") waypoints or other destinations for use by the navigation management system in determining (and displaying) flight paths and navigational indicators.

The system 100 further includes a display 120 (e.g., of the liquid crystal display variety or otherwise) of the conventional type known in the art for dynamic graphical display. The processing unit 110 can drive that display to generate graphical (or other) representations of navigational information such as aircraft location, altitude, bearing, speed, attitude, and so forth in the conventional manner known in the art, albeit as adapted in accord with the teachings hereof, e.g., to display a "flexible" highway-in-the-sky (HITS) flight path having an endpoint that is fixed to a waypoint (or other destination) specified by the pilot and having an origin that is fixed to the current location of the craft and that moves with it (i.e., a flight path that "stays" with the vehicle), a "fixed" HITS flight path that is fixed as to both origin and destination and that does not move relative to the vehicle, and bearing and other navigational flight indicators, all as discussed herein.

Those skilled in the art will appreciate, based on the discussion and drawings herein, that the terms "fixed" and "flexible" are not used in reference to the straightness of any given path but, rather, to whether the craft's current location continually defines the starting point of the path (as is the case with a flexible path) or whether some other point defines that starting point (as is the case with the fixed path). Moreover, it will be appreciated that a fixed path may be straight or curved. The same is true of a flexible path. It will further be appreciated that a flight path may be flexible along one (or more) portion(s) and fixed along one (or more) other portion(s).

In addition, in the illustrated embodiment, the processing unit 110 drives that display 120 to depict the location of the host aircraft, e.g., along with its flight path, using two- and/or three-dimensional representations of the airspace in the vicinity of the host aircraft and of the geography over which it is flying. As used here, "geography" refers not only to natural features, but also manmade ones, e.g., roads, airports, etc. For sake of simplicity in the discussion that follows, these two- and three-dimensional representations are referred to as being of "the airspace in the vicinity of the host aircraft" or, simply, of "the airspace"—though in other embodiments those representations may be of the geography over which that aircraft is flying, as well (as in the case of the illustrated embodiment), or instead (as in the case of embodiments not shown here).

In further reference to FIG. 1, the system 100 additionally includes an array of sensors, receivers and other apparatus 130 that collect navigational data regarding a host aircraft in which the system 100 is disposed, as well as regarding other aircraft and other potential traffic conflicts (e.g., mountains, etc.) in the airspace in the vicinity of the host aircraft. That navigational data includes, by way of example, position, bearing, altitude, speed, attitude, flight path and/or identification, and so forth.

Sensors, receivers and other apparatus 130 are of the type commonly used for collecting this and/or other data useful for cockpit display of flight paths, traffic information, collision avoidance and so forth in accord with the teachings hereof. Types of sensors, receivers and other apparatus 130 for gathering this can include position sensor systems 131, e.g., antenna and receivers for global positioning system (GPS) satellites and/or LORAN beacons; heading sensor systems 132, e.g., magnetic heading sources such as compasses and gyroscopes; altitude sensor systems 133; and air traffic control (ATC) transmitter/receiver; and other sensing apparatus 134 of the type known and/or useful for collecting the aforementioned data. The array of sensors, receivers and other apparatus 130 are coupled to the processing unit 110 in the conventional manner shown in the art, e.g., via I/O section 111.

The processing unit 110 can process information from the sensors, receivers and other apparatus 130 in the conventional manner in order to determine the navigational situation, current operational parameters and operational capabilities (e.g., limits) of the host aircraft, as well as of flight conditions, geography, air traffic, air space restrictions, and so forth. This includes determining, to the extent possible and by way of example, for the host aircraft and potential traffic conflicts (whether from aircraft, mountains, or otherwise) in the oncoming airspace—i.e., that are in the path of the host aircraft—one or more of the following parameters, all by way of example: position, altitude, heading, speed, attitude, size, projected flight path, as well as actual or potential errors in the foregoing.

While many of these parameters can be directly discerned by the sensors, receivers and other apparatus 130, others may be inferred from information gained by those sensors, coupled with information available in the static store 114 and/or obtainable from other sources (e.g., satellite- and/or RF-accessible databases, and so forth).

Thus, for example, the processing unit 110 can discern the size of aircraft (and other potential conflicts) in the oncoming airspace by a database lookup in store 114 keyed on identifications of those craft (and other conflicts) from the sensors, receivers and other apparatus 130. Likewise, flight paths, impending course changes, and so forth, of those aircraft (and other conflicts) may be obtained from RF-accessible databases maintained by nearby control towers, and so forth. Still further, errors in values sensed by sensors, receivers and other apparatus 130 or otherwise determined therefrom can be inferred from database lookups, error estimate calculations, and so forth. Yet still further, operational parameters such as turning ratios, glide-ratio, climbing speed, etc. may be determined by the processing unit 110 directly or may be inferred from other parameters taken from the sensors, receivers and other apparatus 130. These and other parameters may be logged by the processing unit 110 to the store 114 (if not already contained there).

Though FIG. 1 depicts an exemplary configuration of an aviation navigational system according to the invention, those skilled in the art will appreciate that other configurations may be employed in other embodiments of the invention. For example, one or more of the components shown in FIG. 1 can be integrated together as a single physical unit (e.g., processing unit 110 and display 120 can be integrated in a notebook computer, a tablet computer, or the like, that can be easily transferred between aircraft) and/or separated into physically distinct objects, such as having the static storage device 114 embodied as a distinct unit that can be electrically coupled to the remainder of the processing unit 110. Furthermore, communications between devices can be through a wired connection, or by RF or other wireless or remote communication mechanism.

Display of Bearing and Other Navigational Indicators

Figure 2:
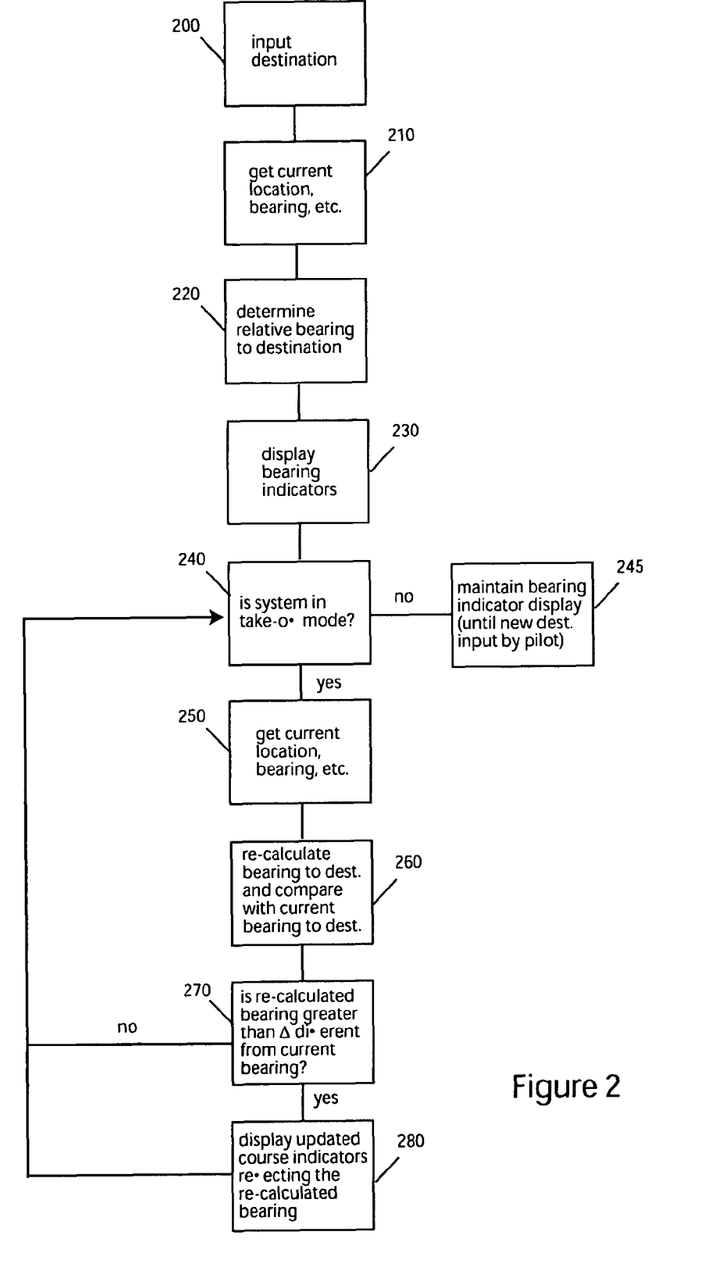
FIG. 2 is a flow diagram illustrating operation of the flight management system according to one practice of the invention.

FIG. 2 is a flow diagram illustrating operation of the system 100 equipped for display of automatically-updated bearing and other navigational indicators (e.g., altitude). The system may provide for such auto-updating in all or selected phases of flight, e.g., by default and/or by pilot action (e.g., via input device 140). In the illustrated embodiment, however, it provides for such auto-updating only in connection with take-off procedures. It is from that perspective that the discussion below proceeds.

In step 200, the processing unit 110 receives a destination location input from the pilot (or other operator), e.g., via input device 140. The destination may be a waypoint (e.g., "LWM VOR"), an airport/runway (e.g., "DTW ILS RWY 22L") or other destination. Though the pilot (or other operator) may enter this information at any point in time, for purposes of the discussion that follows, it is assumed that the pilot will enter the information prior to taxiing down the runway for take-off.

In step 210, the processing unit 110 obtains a current location of the aircraft, as well as a bearing and any other parameters consistent with current flight navigation practice (e.g., altitude, attitude, etc.). In the illustrated embodiment the processing unit 110 uses the sensors, receivers and other apparatus 130 to obtain such information, although in other embodiments the processing unit 110 may obtain the information by other means (e.g., via manual input by the pilot, etc.).

In step 220, the processing unit 110 determines a relative bearing to the inputted destination, e.g., using any of many standard methodologies currently practiced in the area of flight navigation systems. For example, the processing unit 110 may compare the current location and bearing of the aircraft to the inputted destination and generate a corrected relative bearing that the aircraft may follow in order to safely reach the destination, e.g., as flight conditions, geography, air traffic, air space restrictions, the craft's performance capabilities or other conditions permit and/or dictate. Although in the illustrated embodiment, only bearing corrections or adjustments are determined in this step, in further embodiments, other navigational parameters may be determined, such as altitude corrections, speed corrections, etc.

In step 230, the processing unit 110 drives the display 120 to show indicators of the bearing (and other) corrections determined in step 220. These may be graphical (e.g., arrows, lines, etc.), alphanumeric (e.g., digits), or otherwise, in the conventional manner of bearing indicator displays. These may be overlaid on a 2D- or 3D- representation (generated as discussed above) of geography and/or airspace in the vicinity of the aircraft.

Figure 3A:
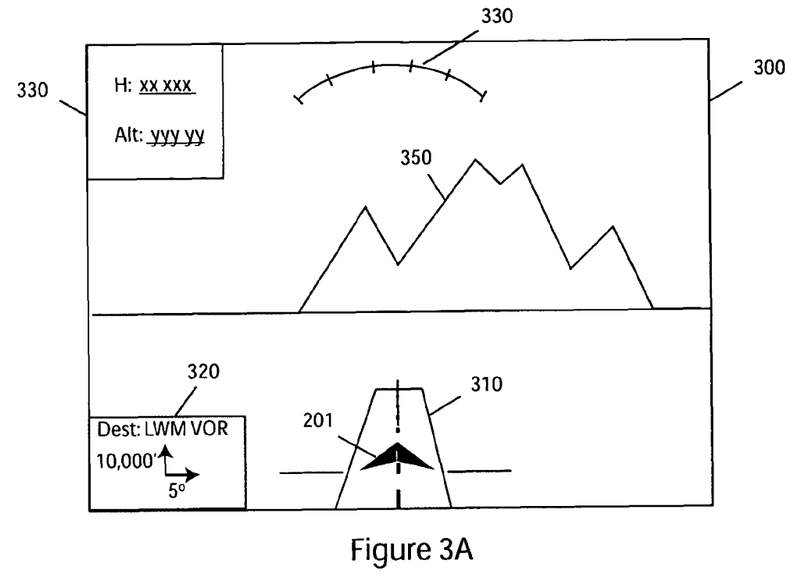
FIGS. 3A-3B depict graphical displays of the type generated by a system according to the invention showing airspace in a vicinity of a host aircraft during take-off and bearing and altitude indicators directing a pilot to a waypoint or other destination.

This is illustrated, by way of non-limiting example, in FIG. 3A. Referring to that drawing, a three-dimensional representation 300 of airspace and terrain includes depictions of a runway 310 and a mountain range 350, although in other embodiments other terrain or objects may be represented (e.g., lakes, oceans, aircraft, etc.). The illustrated display additionally includes graphical and digital representations of navigational information, including bearing and altitude indicators 320 directing the pilot to a pre-programmed waypoint or other destination (here, named "LWM VOR"), as well as height and altitude displays 330. Although depicted here in black-and-white (or grayscale), it will be appreciated that in preferred embodiments such displays and representations may be in color. In this drawing and those that follow, the aircraft in which system 100 is disposed is identified by aircraft icon 201.

It will be appreciated, moreover, that in the illustrated embodiment the aforementioned three-dimensional representation is generated from a designated perspective—here, that of a viewer on the aircraft and, more particularly, a viewer in the cockpit. Other embodiments may use other designated perspectives, e.g., from different vantage points on the aircraft, the ground or otherwise.

Moreover, in the illustrated embodiment, the three-dimensional representation 300 of the airspace in the vicinity of the aircraft is a synthetic 3D image of that airspace as it would appear, e.g., under actual or ideal weather conditions, or otherwise, from the designated perspective; hence, it may not show all airspace in the vicinity of the host aircraft but, rather, only that sector of airspace visible from that perspective. In other embodiments, these representations can be stylized (e.g., to highlight features of interest), wireframe or otherwise.

Referring back to FIG. 2, in step 240, the processing unit 110 determines whether the aircraft is taking off, e.g., taxiing on the runway, navigating toward a first waypoint, or executing some other maneuver commonly connected with take-off. In the illustrated embodiment, this is referred to as "take-off mode," although in other embodiments it may include other phases of flight as well or in addition, e.g., landing.

If the craft is not in take-off mode, it is assumed to be in some other phase of flight (e.g., flying at altitude from the first waypoint to the final destination), referred to here as "normal mode." In normal mode, as reflected in step 245, the processing unit 110 maintains the bearing indicator display that is currently displayed until a new destination is entered by the pilot (i.e., the indicators are static).

If the craft is in take-off mode, the processing unit 110 obtains its current location, as well its bearing, altitude, etc. (as discussed above) from the sensors 130, also, as discussed above; see step 250.

That information is used in step 260, wherein the processing unit 110 re-calculates a relative bearing (and other navigational parameters, e.g., altitude correction) to the destination, e.g., in the same manner as discussed above in step 220.

The processing unit 110 compares the re-calculated information with that currently displayed, per steps 230, 280. In the illustrated embodiment, if the differences are substantial—e.g., the re-calculated bearing differs from the displayed bearing by more than a selected variance (e.g., 30°, in some embodiments, 20° in other embodiments, 10° in still further embodiments, and so forth)—the processing unit 110 drives the display 120 to generate updated representations of the bearing and other navigational indicators; see, steps 270 and 280. This obviates the pilot having to re-program a destination into the unit in order to update the displays.

Figure 3B:
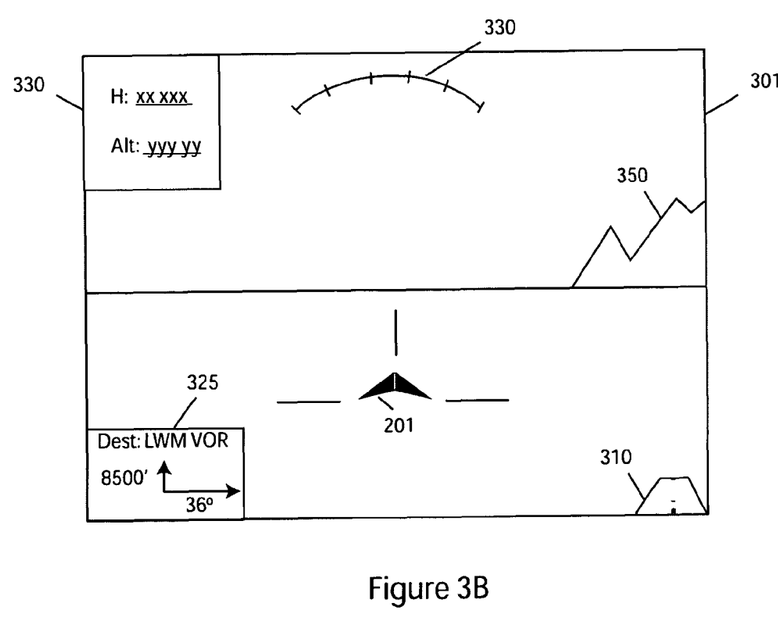

This is illustrated, by way of non-limiting example, in FIG. 3B. Referring to that drawing, a three-dimensional display 301 of the airspace and terrain are represented, e.g., as discussed above in reference to FIG. 3A. Similarly, FIG. 3B additionally includes bearing and altitude indicators 325, also as discussed above in reference to FIG. 3A, although here, by way of example, the indicators 325 display different bearing and altitude information (36° and 8500', respectively).

Alternatively, if the re-calculated bearing (or other navigational parameters) are within range of the currently displayed indicators (i.e., they vary by less then the preselected variance), then the processing unit 110 maintains the currently displayed bearing indicators 320. Regardless, following steps 250-280, the processor loops back to step 240.

Regardless, following steps 250-280, the processor loops back to step 240.

Display of HITS Flight Pathways

Figure 4:
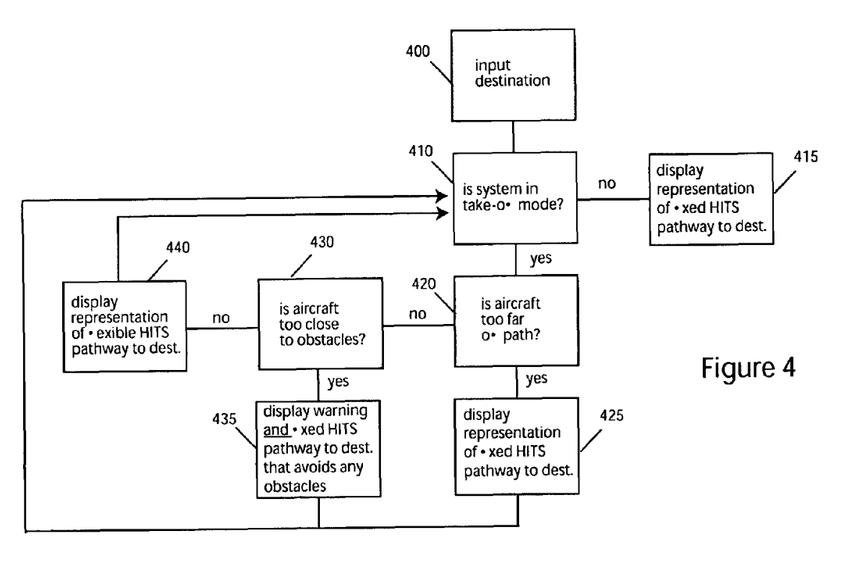
FIG. 4 is a flow diagram illustrating operation of the flight management system according to one practice of the invention.

FIG. 4 is a flow diagram illustrating operation of the system 100 equipped for selective display of flexible and fixed HITS flight pathways. In the illustrated embodiment, the system displays fixed HITS pathways when the aircraft is in the so-called normal mode (as defined above), e.g., when the craft has completed take-off maneuvers and is flying at altitude from a first waypoint to the final destination and during landing procedures.

Conversely, it displays flexible HITS pathways when the aircraft is in take-off mode (also, as defined above), e.g., when the craft is navigating toward a first waypoint, or executing some other maneuver commonly connected with take-off. In that mode, the illustrated system will display a flexible HITS pathway, but, automatically switch to display of fixed HITS pathways, e.g., (i) when the craft completes its take-off procedure, for example, by reaching the first waypoint (or other destination) programmed into the system 100, (ii) when the craft comes within a predetermined variance of distance of and/or bearing to that waypoint (or other destination), and/or (iii) when flight conditions, geography, air traffic, air space restrictions, the craft's performance capabilities or other conditions dictate (for safety or other reasons) that the flight management system switch from the first to the second mode (i.e., from flexible to a fixed HITS display). Although other embodiments may vary in these regards, it is from these perspectives that the discussion below proceeds.

Operation of the system 100 may be appreciated by reference to FIG. 4 and the discussion below, as well as by reference to FIGS. 5A-5D and FIG. 6, which depict displays generated by the system 100 in conjunction with the various modes of operation discussed herein. It will be appreciated that, although the illustrated embodiment represents the fixed and flexible flight paths with 3D HITS symbology, as shown, by way of example, in FIGS. 5A-5D and FIG. 6, the flight paths may be represented otherwise in alternate embodiments (e.g., in two-dimensions, etc.).

In step 400, the processing unit 110 receives a destination location input from the pilot (or other operator), e.g., via input device 140. The destination may be a waypoint (e.g., "LWM VOR"), an airport/runway (e.g., "DTW ILS RWY 22L") or other destination. Though the pilot (or other operator) may enter this information at any point in time, for purposes of the discussion that follows, it is assumed that the pilot will enter the information prior to taxiing down the runway for take-off or at a subsequent time, when the craft is in flight.

Figure 5A:
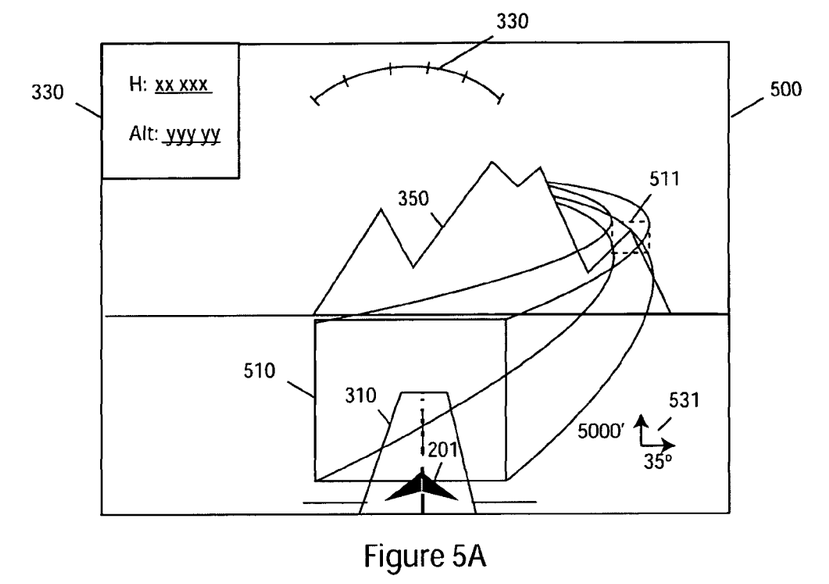
FIG. 5A-5B depict three-dimensional (3D) graphical displays of the type generated by a system according the invention, including depictions of flexible highway-in-the-sky (HITS) flight paths.
Figure 5B:
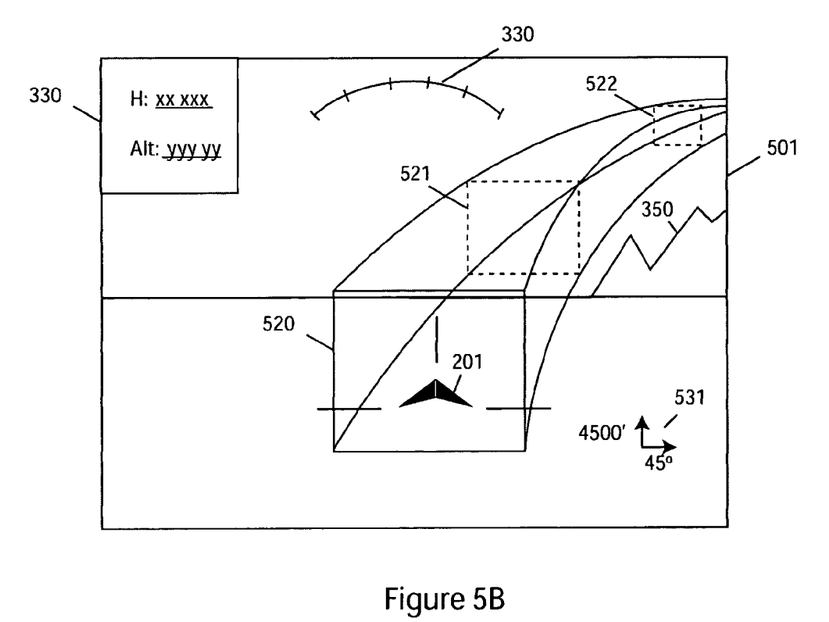

In step 410, the processing unit 110 determines whether the craft is in normal or take-off mode. If in normal mode (e.g., en route from a waypoint to a final destination), as indicated in step 415, the processing unit 110 drives the display 120 to generate a representation of a "fixed" HITS pathway to the destination. This is depicted, by way of example, in FIG. 5D, showing fixed HITS pathway 540 originating at a waypoint and terminating at a destination 542. That waypoint is assumed to be behind the craft for purposes of illustration and, hence, is not shown in the drawing.

Logic executed by the processor to generate that pathway 540 may be of the type known in the art for generating fixed HITS pathways, e.g., as a function of official airways or approach paths defined by the FAA and/or other agencies, the craft's operational capabilities, and so forth. As noted above, such a pathway is fixed and does not move relative to the aircraft, but rather maintains the same position irrespective of the aircraft's current location. Thus, for example, were the craft depicted in FIG. 5D to veer off course, the portion of the pathway 540 ahead of the craft would remain visible; however, the craft icon 201 would no longer be centered at the opening of the displayed pathway 540.

As shown in the drawing, the pathway 540 is overlaid on a 2D- or 3D- representation 503 (generated as discussed above) of geography and/or airspace in the vicinity of the aircraft, e.g., as shown in FIG. 5D.

Conversely, if the craft is in take-off mode, the processing unit 110 determines whether to display the HITS pathway in fixed or flexible mode. To this end, in step 420, the processor obtains a current location of the aircraft, as well as the bearing, altitude, etc. (e.g., in the manner discussed above). The processing unit 110 uses the aircraft's location and operational capabilities (e.g., as maintained in store 114), etc., to determine whether the aircraft has deviated substantially beyond a previously determined flight path to the destination (i.e., the aircraft is too far off-course). This may be based solely on distance, as where the processing unit determines a vehicle is off-course if it is 2500', 5000' or so forth from a previously determined flight path. In some embodiments, it may also be based on flight conditions, geography, air traffic, air space restrictions, the craft's performance capabilities and so forth. Thus, for example, if the craft is less than 2500' from the original flight path by direct travel, but by more than 5000' for a route circumventing intervening restricted airspace, air traffic or other obstacles, then the latter figure is used in determining whether the craft has deviated substantially off course.

Regardless, as indicated in step 425, if the aircraft is too far off-course, the processing unit 110 will drive the display 120 to generate a representation of a fixed HITS pathway to the destination (again, as above, using conventional logic known in the art for generating such pathways), e.g., overlaid on a 2D- or 3D- representation (generated as discussed above) of geography and/or airspace in the vicinity of the aircraft. As discussed above, determination of that fixed pathway may be made in the conventional manner known in the art, e.g., as a function of official airways defined by the FAA and/or other agencies, the craft's operational capabilities, and so forth.

In step 430, alternatively, if the aircraft is currently on-course (e.g., not too far from the destination), the processor 110 further determines whether the aircraft is within range of any obstacles (e.g., mountains, aircraft, restricted airspace, etc.). In the illustrated embodiment, the selected range may a pre-defined minimum distance the aircraft is allowed to maintain from such obstacles (e.g., 0.5 miles, in some embodiments, 1 mile in other embodiments, 5 miles in still further embodiments, and so forth), though, in some embodiments, that minimum may take into account operational capabilities of the craft (e.g., as maintained in store 114).

If the aircraft is within that selected range of an obstacle (i.e., too "close" to an obstacle), as indicated in step 435, the processing unit 110 drives the display 120 to generate a warning (e.g., a flashing red light on the display 120, etc.), and a fixed HITS pathway (as above, using conventional logic known in the art for generating such pathways) on a 2D- or 3D-representation (generated as discussed above) of geography and/or airspace in the vicinity of the aircraft. An example of this is fixed pathway 530 depicted in FIG. 5C. Here, the fixed HITS pathway 530 represents a flight path to the destination that avoids the obstacles at issue. The origin of that pathway 530 can be fixed to the location at which the warning condition was detected, or otherwise.

Alternatively, as indicated in step 440, if the aircraft is not too close to any obstacles, and the aircraft is not too far off-course, the processing unit 110 drives the display to generate a flexible HITS pathway representing a flight path from the aircraft's current location to the destination. Examples of this are provided by pathways 510 of FIG. 5A and 520 of FIG. 5B, both originating at the craft and terminating at a destination (not shown). Such pathways (and, particularly, their origins) move with the craft and, hence, the craft icon 201 remains centered at the opening of the displayed pathways (e.g., so long as the system 100 continues to display a flexible pathway).

Logic executed by the processor to generate that pathway may be adapted from that known in the art for generating fixed HITS pathways, albeit using the craft's current location as a starting point of the pathway. As above, in preferred embodiments, the depiction of the flexible HITS pathway is overlaid on a 2D- or 3D- representation (generated as discussed above) of geography and/or airspace in the vicinity of the aircraft.

In the illustrated embodiment, the flexible HITS flight pathway 510, 520 automatically updates depending on the location, bearing, etc., of the aircraft. This can be effected by the return logic loop shown between steps 440 and 410 in the drawing or otherwise.

Though evident in the discussion above, for sake of completeness, it will be appreciated that FIGS. 5A-5B depict three-dimensional (3D) graphical displays 500, 501 of the type generated by system 100, including depictions of flexible highway-in-the-sky (HITS) flight paths 510, 520, as discussed above. These additionally include depictions of runway 310, mountains 350, bearing and navigational indicators 531, and other navigational information 330, as well as the aircraft icon 201 itself.

Figure 5C:
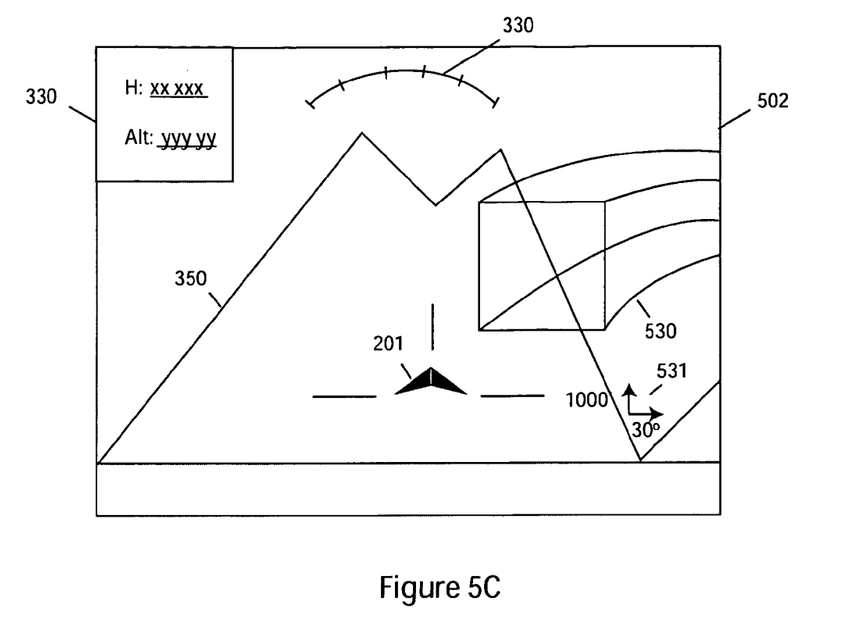
FIGS. 5C-5D depict three-dimensional (3D) graphical displays of the type generated by a system according to the invention, including depictions of fixed HITS flight paths.
Figure 5D:
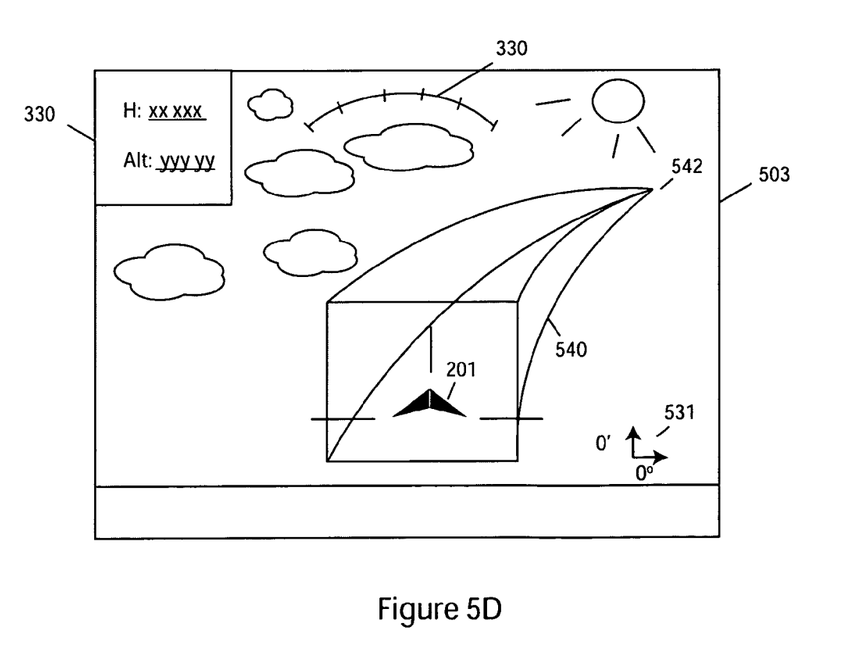

Likewise, FIGS. 5C-5D depict three-dimensional (3D) graphical displays 502, 503 of the type generated by system 100, including depictions of fixed highway-in-the-sky (HITS) flight paths 530, 540, again, as discussed above. These, too, include depictions of mountains 350, bearing and navigational indicators 531, a destination 542, and other navigational information 330, as well as the aircraft icon 201 itself.

Figure 6:
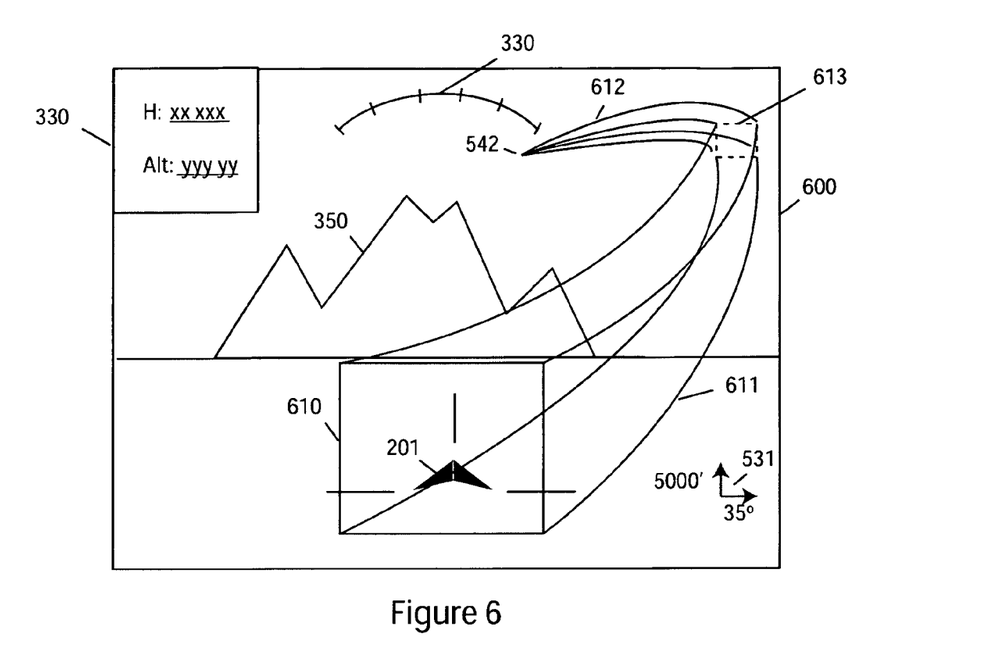
FIG. 6 depicts a three-dimensional (3D) graphical display of the type generated by a system according to one aspect of the invention, including a depiction of a HITS flight path that is flexible along a first portion of the path, and fixed along a second portion.

As noted earlier, the system 100 can display a flight path that is flexible along one (or more) portion(s) and fixed along one (or more) other portion(s). An example of this is shown in FIG. 6, depicting a three-dimensional (3D) graphical display 600 of the type generated by system 100, including a depiction of a highway-in-the-sky (HITS) flight path 610 that is flexible along a first portion 611 and fixed along a second portion 612. As above, this includes depictions of mountains 350, bearing and navigational indicators 531, a destination 542, and other navigational information 330, as well as the aircraft 201 icon itself.

With further reference to FIGS. 5A-5B and FIG. 6, dashed lines 511, 521, 522, and 613 are provided to more clearly illustrate the respective (three-dimensional) HITS pathways to the reader. Such lines may or may not be displayed by systems according to the invention, which may alternatively use shading, coloration or other graphical techniques to depict such pathways.

In the illustrated embodiment, as discussed above, the aforementioned three-dimensional representations are generated from a designated perspective—here, that of a viewer on the aircraft and, more particularly, a viewer in the cockpit. Other embodiments may use other designated perspectives, e.g., from different vantage points on the aircraft. Moreover, the three-dimensional representations of the airspace in the vicinity of the aircraft is a synthetic 3D image of that airspace as it would appear, e.g., under actual or ideal weather conditions, or otherwise, from the designated perspective; hence, it may not show all airspace in the vicinity of the host aircraft but, rather, only that sector of airspace visible from that perspective). In other embodiments, these representations can be stylized (e.g., to highlight features of interest), wireframe or otherwise.

Described herein are systems and methods of operation meeting the objectives set forth above. Those skilled in the art will appreciate that the embodiments presented herein are merely examples and that other embodiments, incorporating changes thereto, fall within the scope of the invention.

In view of the foregoing, What I claim is:

1. A flight management system for use with an aerial vehicle, comprising:
 a display,
 a processor coupled to the display, the processor driving the display to generate a graphical representation of airspace in a vicinity of the aerial vehicle,
 the processor further driving the display to generate (i) in a first mode, a depiction of a flexible highway-in-the-sky (HITS) flight path having an endpoint that is fixed to a destination and having an origin that moves relative to a current location of the aerial vehicle, (ii) in a second mode, a fixed HITS fight path that is fixed as to origin and destination and that does not move relative to the aerial vehicle.

2. The flight management system of claim 1, wherein the processor drives the display to generate any of a two-dimensional (2D) or three-dimensional (3D) depiction of the flight path against a map or other representation of topography over which flight will occur.

3. The flight management system of claim 1, wherein the processor drives the display to generate a three-dimensional (3D) depiction of the flight path against a three-dimensional representation of topography and airspace.

4. The flight management system of claim 2, wherein the three-dimensional graphical representation of airspace is from a perspective of a viewer on the aerial vehicle.

5. The flight management system of claim 1, wherein the three-dimensional graphical representation of airspace is a synthetic 3D image.

6. The flight management system of claim 1, wherein the flexible HITS flight path is generated as a function of at least the (i) current location of the aerial vehicle, and (ii) a destination location entered into the processor by a pilot.

7. The flight management system of claim 1, wherein the processor enters the first mode of operation during take-off procedures.

8. The flight management system of claim 1, wherein the processor switches from the first mode to the second mode subsequent to completion of take-off procedures.

9. The flight management system of claim 1, wherein the processor switches from the first mode to the second mode upon any of (i) the aerial vehicle reaching a waypoint or other destination, (ii) the aerial vehicle coming within a predetermined variance in distance and/or bearing to that waypoint or other destination, and/or (iii) flight conditions, geography, air traffic, air space restrictions, the aerial vehicle's performance capabilities or other conditions requiring the processor to switch from the first mode to the second mode.

10. A flight management system for use with an aerial vehicle, comprising:
 a display,
 a processor coupled to the display, the processor driving the display to generate a graphical representation of airspace and/or terrain in a vicinity of the aerial vehicle,
 the processor further driving the display to generate (i) in a first mode, textual or graphical depictions of one or more indicators of bearing that the processor automatically updates relative to a current location of the aerial vehicle, and, (ii) in a second mode, textual or graphical depictions of one or more static indicators of bearing that remain fixed until recalculated by the processor upon a request from a pilot or other operator.

11. The flight management system of claim 10, wherein the processor drives the display to generate the indicators in conjunction with a map or other representation of topography over which flight will occur.

12. The flight management system of claim 10, wherein the flexible indicators are generated as a function of at least the (i) current location of the aerial vehicle, and (ii) a destination location entered into the processor by a pilot.

13. The flight management system of claim 10, wherein the processor enters the first mode of operation during take-off procedures.

14. The flight management system of claim 10, wherein the processor switches from the first mode to the second mode subsequent to completion of take-off procedures.

15. The flight management system of claim 10, wherein the processor switches from the first mode to the second mode upon any of (i) the aerial vehicle reaching at waypoint or other destination, (ii) the aerial vehicle coming within a predetermined variance in distance and/or bearing to that waypoint or other destination, and/or (iii) flight conditions, geography, air traffic, air space restrictions, the aerial vehicle's performance capabilities or other conditions requiring the processor to switch from the first mode to the second mode.

16. The flight management system of claim 10, wherein the processor further drives the display to generate a depiction of a flexible highway-in-the-sky (HITS) flight path that moves relative to a current location of the aerial vehicle and is fixed relative to the destination.

17. The flight management system of claim 10, wherein the processor further drives the display to generate a depiction of a fixed HITS fight path that is fixed relative to both a current location of the aerial vehicle and to the destination.

18. A method of representing flight paths for an aerial vehicle, comprising:
    driving a display to generate a three-dimensional (3D) graphical representation of airspace within a vicinity of the aerial vehicle, and
    driving the display to further generate, (i) in a first mode, a depiction of a flexible highway-in-the-sky (HITS) flight path having an endpoint that is fixed to a destination and having an origin that moves relative to a current location of the aerial vehicle, and, (ii) in a second mode, a fixed HITS fight path that is fixed as to origin and destination and that does not move relative to the aerial vehicle.

19. A method of representing bearing indicators for an aerial vehicle, comprising:
    generating a graphical representation of airspace and/or terrain in a vicinity of the aerial vehicle,
    further generating (i) in a first mode, textual or graphical depictions of one or more indicators of bearing that a processor automatically updates relative to a current location of the aerial vehicle, and, (ii) in a second mode, textual or graphical depictions of one or more static indicators of bearing that remain fixed until recalculated by the processor upon a request from a pilot or other operator.

* * * * *

UNITED STATES PATENT AND TRADEMARK OFFICE
CERTIFICATE OF CORRECTION

Page 1 of 1

PATENT NO. : 7,869,943 B1
APPLICATION NO. : 11/963763
DATED : January 11, 2011
INVENTOR(S) : Jeffrey M. Simon It is certified that error appears in the above-identified patent and that said Letters Patent is hereby corrected as shown below:

Title page, Item (57) Abstract, line 9
"fight" should be changed to --flight--.

Column 11, line 63; Column 13, line 10; and Column 14, line 4
"fight" should be changed to --flight--.

Signed and Sealed this
Twenty-third Day of August, 2011

David J. Kappos
*Director of the United States Patent and Trademark Office*